(12) United States Patent
Zheng et al.

(10) Patent No.: US 10,119,020 B2
(45) Date of Patent: Nov. 6, 2018

(54) MODIFIED UREA-FORMALDEHYDE BINDERS FOR NON-WOVEN FIBER GLASS MATS

(75) Inventors: Guodong Zheng, Highlands Ranch, CO (US); Mingfu Zhang, Highlands Ranch, CO (US); Luke Saylor Weith, Centennial, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 284 days.

(21) Appl. No.: 13/300,841

(22) Filed: Nov. 21, 2011

(65) Prior Publication Data
US 2013/0130582 A1 May 23, 2013

(51) Int. Cl.
| | | |
|---|---|---|
| C08L 61/00 | (2006.01) | |
| C08L 61/24 | (2006.01) | |
| C08J 5/04 | (2006.01) | |
| C08J 5/24 | (2006.01) | |

(52) U.S. Cl.
CPC .............. *C08L 61/00* (2013.01); *C08J 5/043* (2013.01); *C08J 5/24* (2013.01); *C08L 61/24* (2013.01); *C08J 2361/24* (2013.01); *Y10T 442/2992* (2015.04)

(58) Field of Classification Search
None
See application file for complete search history.

(56) References Cited

U.S. PATENT DOCUMENTS

| | | | | |
|---|---|---|---|---|
| 2,302,309 | A * | 11/1942 | Glarum | C08B 31/00 435/203 |
| 3,485,776 | A * | 12/1969 | Bruner et al. | 8/115.6 |
| 4,014,726 | A | 3/1977 | Fargo | |
| 4,255,485 | A | 3/1981 | Yau | |
| 4,654,259 | A * | 3/1987 | Stofko | 428/326 |
| 4,855,354 | A * | 8/1989 | Mohler et al. | 525/54.24 |
| 5,026,746 | A * | 6/1991 | Floyd et al. | 524/50 |
| 6,180,037 | B1 * | 1/2001 | Andersen et al. | 264/108 |
| 7,435,483 | B2 * | 10/2008 | Lee et al. | 428/481 |
| 7,662,258 | B2 | 2/2010 | Nandi et al. | |
| 7,691,761 | B2 | 4/2010 | Nandi et al. | |
| 2002/0054994 | A1 * | 5/2002 | Dupre et al. | 428/349 |
| 2005/0070186 | A1 * | 3/2005 | Shoemake et al. | 442/176 |
| 2008/0083522 | A1 * | 4/2008 | Poggi et al. | 162/158 |
| 2008/0160854 | A1 | 7/2008 | Nandi et al. | |
| 2009/0124151 | A1 * | 5/2009 | Shoemake | 442/180 |

FOREIGN PATENT DOCUMENTS

| | | | | |
|---|---|---|---|---|
| EP | 0354023 | A2 * | 2/1990 | D04H 1/587 |
| GB | 907 302 | A | 10/1962 | |
| GB | 1 457 216 | A | 12/1976 | |
| WO | 2008/150647 | A1 | 12/2008 | |
| WO | 2010/108999 | A1 | 9/2010 | |
| WO | 2011/019597 | A1 | 2/2011 | |

* cited by examiner

*Primary Examiner* — Chinessa T. Golden
(74) *Attorney, Agent, or Firm* — Robert D. Touslee

(57) ABSTRACT

Urea-formaldehyde (UF) resin binder compositions modified with a starch are described. The binder compositions may include about 1 wt. % to about 10 wt. % of a starch. In addition, fiber reinforced composites are described. The composites may include organic or inorganic fibers and a polymer matrix formed from a binder composition. The binder composition may include a UF resin and about 1 wt. % to about 10 wt. % of a starch.

19 Claims, 1 Drawing Sheet

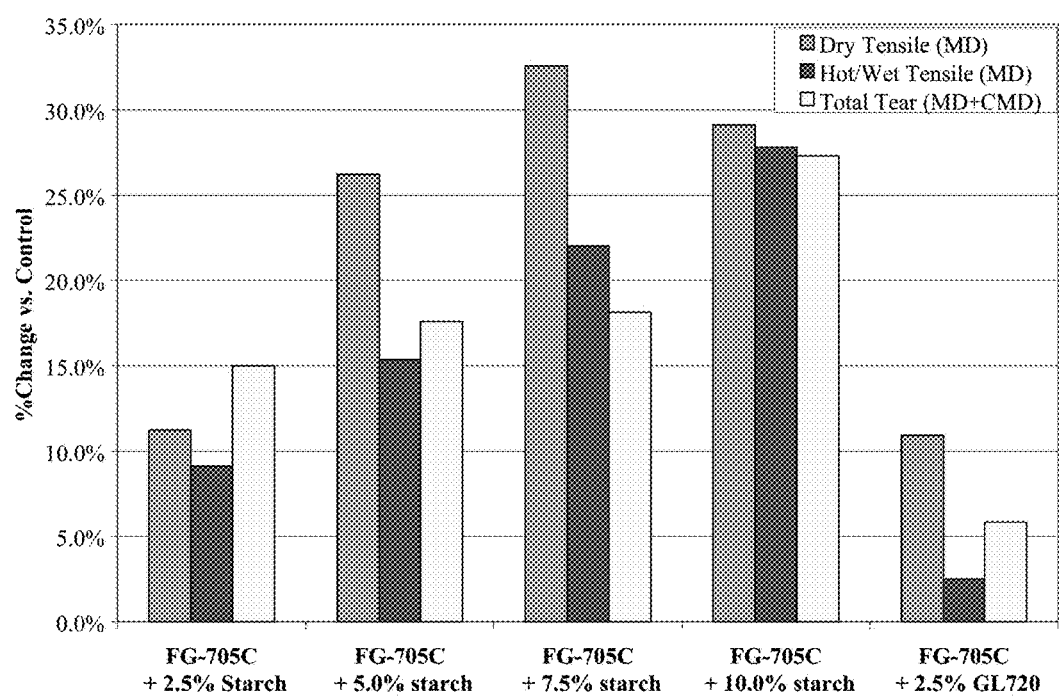

MODIFIED UREA-FORMALDEHYDE BINDERS FOR NON-WOVEN FIBER GLASS MATS

CROSS-REFERENCES TO RELATED APPLICATIONS

The present application is related to co-assigned U.S. Pat. No. 7,662,258 issued Feb. 16, 2010; and U.S. Pat. No. 7,691,761 issued Apr. 6, 2010. The entire contents of both patents are herein incorporated by reference for all purposes.

BACKGROUND OF THE INVENTION

Thermoset urea-formaldehyde (UF) resins are commonly used as binders for fiber reinforced composites because of their suitability for various applications and their relatively low cost. However, fiber reinforced composites bonded with neat UF resin are often brittle and cause processing and product performance issues. In order to overcome these issues, it is common to modify UF resin with conventional latexes, such as polyvinyl acetate, vinyl acrylic, or styrene-butadiene latexes. Modifying UF resin with conventional latexes improves the flexibility of fiber reinforced composites which in turn improves the strength of fiber reinforced composites. Improved strength is needed to achieve high speed processing of fiber reinforced composites on commercial manufacturing lines as well as optimal product performance. However, these conventional latex modifiers are typically expensive and the modification of UF resins with conventional latexes increases binder cost significantly. In addition, conventional latexes are petroleum-based, and are thus derived from a non-renewable and non-sustainable resource. Therefore, there is a need to develop binder compositions that are more cost effective, more environmentally sustainable, and that do not degrade the strength of fiber reinforced composites.

BRIEF SUMMARY OF THE INVENTION

Binder compositions are described that include urea-formaldehyde (UF) resin and a starch modifier at concentration levels that strengthen the tensile and tear strength (among other properties) of composites formed with the binder compositions. The starch may replace at least a portion of the conventional, petroleum-based modifiers used in the binder compositions to create composites based on more sustainable and renewable materials than conventional composites.

There is widespread belief that starches would make inadequate substitutes for petroleum-based modifiers, especially in composites exposed to hot, humid conditions such as roofing materials. The present starch-containing binder compositions are shown to form composites with hot/wet tensile strength that is actually higher than comparable composites made exclusively with petroleum-based modifiers. Thus, the present binder compositions are not only made with environmentally advantageous materials, they also demonstrate performance characteristics that make them superior materials for challenging environments such as roofing materials in hot, humid climates.

Embodiments of the invention include binder compositions that include UF resins and starch used as a modifier/strengthener. The concentration of the starch may by about 1 wt. % to about 10 wt. % of the binder composition.

Embodiments of the invention further include fiber reinforced composites that include a polymer matrix formed from a binder composition having UF resin and about 1 wt. % to about 10 wt. % of a starch. The composites may further include organic and/or inorganic fibers.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals may be used throughout the drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIG. 1 is a graph of dry tensile in machine-direction (MD), hot/wet tensile (MD), and total tear strengths for fiber glass mat samples bonded with modified UF resins, expressed as a ratio to a standard UF resin.

DETAILED DESCRIPTION OF THE INVENTION

Exemplary binder compositions and their use in fiber reinforced composites are described. These compositions may include combinations of conventional thermoset binders such as urea-formaldehyde (UF) and starches to at least partially replace more conventional, petroleum-based modifiers such as polyvinyl acetate, acrylic latexes, and/or styrene-butadiene latexes, among other modifiers. The fiber reinforced composites made from these binder compositions may have tensile and tear strength characteristics that exceed those made exclusively with petroleum-based modifiers.

Exemplary Binder Compositions

The present binder compositions may include a urea-formaldehyde based resin and one or more starch compounds with concentrations that promote the toughening and/or strengthening of a composite made from the binder. Exemplary starch concentration ranges may be from about 1 wt. % to about 10 wt. % of the binder composition. Additional exemplary starch concentration ranges may include about 1 wt. % to about 7.5 wt. %; about 1 wt. % to about 5 wt. %; 1 wt. % to about 4 wt. %; about 1 wt. % to about 3 wt. %; about 1 wt. % to about 2.5 wt. %; about 1 wt. % to about 2 wt. %; about 1 wt. % to about 1.5 wt. %. etc.

A ceiling for the starch concentration may be set such that the starch does not function as a significant thickener in the binder composition that substantially increases the viscosity of the composition. For example, the concentration of the starch may have an upper limit threshold of about 10 wt. % in embodiments where it is not desired for the starch to act as a thickener.

The starches used in the present binder compositions may include one or more native or modified starches. The native or modified starches may be derived from corn, potatoes, tapioca, or wheat among other sources. Exemplary modified starches may include cationic or anionic starches. One example of modified cationic starch is the RediBOND5330 starch produced by National Starch.

In some embodiments, the size of the starch compounds may be controlled to affect the thickness of the binder compositions. Exemplary weight average molecular weights may include a range of about 200,000 g/mol or less; about 190,000 g/mol or less; about 180,000 g/mol or less; about 170,000 g/mol or less; about 160,000 g/mol or less; or about 150,000 g/mol or less; etc. Further exemplary weight average molecular weights may include about 100,000 g/mol or less; about 90,000 g/mol or less; about 80,000 g/mol or less; about 70,000 g/mol or less; about 60,000 g/mol or less; about 50,000 g/mol or less; etc.

Higher weight average molecular weight ranges for the starches are also contemplated for embodiments of the present binder compositions. For example, the starch may have a weight average molecular weight range of about 100,000 to about 2,000,000 g/mole. Additional exemplary ranges include about 200,000 to about 1,000,000 g/mole.

The present binder compositions may alternatively include a urea-formaldehyde based resin, one or more starch compounds, and/or one or more petroleum-based modifiers. The petroleum-based modifiers may include polyvinyl acetate, acrylic latexes, and/or styrene-butadiene latexes, among other modifiers. The weight ratio of the starch to the petroleum-based plasticizer may be about 0.1:1 or more. Alternatively, the starch may replace about 10 wt. % of the petroleum-based plasticizer.

The thermosetting urea-formaldehyde (UF) resins used in the present binder compositions may be prepared from urea and formaldehyde monomers and UF precondensates. Suitable resin compositions include thermosetting UF resin compositions that can be used for making binder compositions for fiber mats. Any form of these resin compositions which can react with other reactants and not introduce extraneous moieties deleterious to the desired reaction and reaction product can be utilized. Exemplary thermosetting UF resins that may be used in preparing the present binder compositions are disclosed in U.S. Pat. No. 5,851,933, the disclosure of which is incorporated herein by reference for all purposes.

Formaldehyde for making the thermosetting UF resin is available in many forms. Examples include paraform (solid, polymerized formaldehyde) and formalin solutions (aqueous solutions of formaldehyde, sometimes with a small amount of methanol, in 37%, 44%, or 50% formaldehyde concentrations). Formaldehyde also is available as a gas.

Similarly, urea for thermosetting UF resins is available in many forms. Solid urea, such as prill, and urea solutions, typically aqueous solutions, may be used. Further, the urea may be combined with another moiety, such as formaldehyde and urea-formaldehyde adducts, which may be provided in aqueous solution.

A wide variety of procedures may be used for reacting the principal urea and formaldehyde components to form an aqueous thermosetting UF resin composition, such as staged monomer addition, staged catalyst addition, pH control, and amine modification among other procedures. The urea and formaldehyde may be reacted at a mole ratio of formaldehyde to urea in the range of about 1.1:1 to 4:1. For example, urea and formaldehyde may be reacted at an F:U mole ratio of between about 2.1:1 to 3.2:1. The U-F resin may also be highly water dilutable, if not water soluble.

Exemplary resin compositions may contain reactive methylol groups, which upon curing form methylene or ether linkages. Such methylol-containing adducts may include N,N'-dimethylol, dihydroxymethylolethylene; N,N'bis(methoxymethyl), N,N'-dimethylolpropylene; 5,5-dimethyl-N,N'dimethylolethylene; N,N'-dimethylolethylene; and the like.

Thermosetting UF resins useful in the practice of the invention may contain 45 to 75% by weight nonvolitiles, for example about 50 to 60% by weight nonvolitiles. These resins may also have an initial viscosity of about 50 to 600 cPs. For example, a thermosetting UF resin useful in the practice of the invention may have a viscosity of 150 to 400 cPs. Additionally, a thermosetting UF resin may exhibit a pH of 7.0 to 9.0 or alternatively 7.5 to 8.5. These resins may also have a free formaldehyde level of not more than about 3.0% (for example less than 1%) and a water dilutability of 1:1 to 100:1 (for example 5:1 and above).

A resin modifier such as ammonia, alkanolamines, or polyamines may be added to the reactants that are used to make the UF resin. Polyamines may include an alkyl primary diamine such as ethylenediamine (EDA). Additional modifiers, such as melamine, ethylene ureas, primary amines, secondary amines, and tertiary amines may also be incorporated into a UF resin. Concentrations of these modifiers in the reaction mixture often will vary from 0.05 to 15.0% by weight of the UF resin solids. These types of modifiers may promote hydrolysis resistance, polymer flexibility, and lower formaldehyde emissions in the cured resin. Further urea additions for purposes of scavenging formaldehyde or as a diluent may also be used. The present binder compositions may also contain a variety of additives such as silica colloid to enhance fire resistance, antifoamers, biocides, pigments, surfactants and the like.

The binder compositions may have a solids content of about 5 wt. % to about 70 wt. %. Exemplary solids contents for binder compositions that have not been diluted with water (e.g., resin compositions) may be greater than about 35 wt. %; greater than about 40 wt. %; greater than about 45 wt. %; greater than about 50 wt. %; etc. Exemplary solids content ranges may include about 5 wt. % to about 35 wt. % and about 45 wt. % to about 70 wt. %, among others. Exemplary solids contents for aqueous binder compositions may include about 35 wt. % or less; about 30 wt. % or less; about 25 wt. % or less; about 20 wt. % or less; about 15 wt. % or less; etc. Exemplary solids content ranges for aqueous binder compositions may include about 10 wt. % to about 30 wt. %, among others.

Exemplary Fiber Reinforced Composites

The present fiber reinforced composites may include a binder matrix made from the present binder compositions and organic and/or inorganic fibers. Organic fibers may include without limitation, acrylic, aromatic polyamides, polyesters, cellulosic fibers, and/or polyolefin fibers among others. Exemplary inorganic fibers may include mineral fibers, ceramic fibers, graphite fibers, metal fibers, metal coated glass or graphite fibers, and/or glass fibers among others. Various glass fibers may be suitable for use in this invention including E type, T type, C type, A type, and S type glass fibers. In one embodiment, a fiber reinforced composite may include a binder matrix made from the present binder compositions and glass fibers. In another embodiment, a fiber reinforced composite may include a binder matrix made from the present binder composition, glass fibers, and up to about 25 wt. % organic fibers.

Fibers used in the present fiber reinforced composites may independently have lengths of about ¼ inch to 5 inches (about 6 to about 140 mm) and diameters of about 3 to 25 microns. For example, glass fibers having diameters in the range of 3 to 25 microns may be used. Alternatively, glass fibers having diameters in the range of 12 to 17 microns may be used. The glass fibers may all have about the same target length, such as 0.75 inches, 1 inch, or 1.25 inches. However, fibers of different lengths and diameters can also be used to produce composites with different characteristics. Glass fibers used in a wet process for making fiber glass mats may be up to about 3 to 5 inches in length, and even longer fibers can be used in some processes. Generally the longer the fiber, the higher the tensile and strengths of the mat, but the poorer the fiber dispersion.

In addition (or in lieu of) the fibers, solid particles such as organic and/or inorganic flakes (e.g., carbon and/or glass flakes) may reinforce the composite. Other reinforcing solid particles may include ceramic particles, metal particles such as aluminum, and amorphous materials including polymers and carbon black among other particles.

The fiber reinforced composites may include fiber reinforced mats used for building materials, for example, as components of roofing shingles. The mats may be formed by contacting the binder compositions with a woven or non-woven mat of fibers (e.g., glass fibers) and curing the mixture to form the composite mat. The finished mat may contain about 55 wt. % to about 97 wt. % fibers, and about 3 wt. % to about 45 wt. % (e.g., about 15-30 wt. %) of the binder matrix (i.e., the cured binder).

The present fiber reinforced composites that include starch as a modifier/strengthener have comparable and in some cases enhanced strength characteristics compared with composites made exclusively with petroleum-based modifiers. For example, fiber reinforced composites that include starch have hot/wet tensile strengths that are about 5% to about 10% greater than fiber reinforced composites that include acrylic latex modifier. In another example, fiber reinforced composites that include starch have total tear strengths that are about 5% to about 10% greater than fiber reinforced composites that include acrylic latex modifier.

The present fiber reinforced composites that include starch as a modifier/strengthener also have enhanced strength characteristics compared with composites made without modifiers/strengtheners. For example, fiber reinforced composites that include starch have tensile strengths that are about 5% to about 40% greater than fiber reinforced composites made with unmodified UF resin. In another example, fiber reinforced composites that include starch have hot/wet tensile strengths that are about 5% to about 35% greater than fiber reinforced composites made with unmodified UF resin. In an alternate example, fiber reinforced composites that include starch have total tear strengths that are about 10% to about 35% greater than fiber reinforced composites made with unmodified UF resin.

EXPERIMENTAL

As noted above, the fiber reinforced composites made from the present binder compositions show improved dry tensile, hot/wet tensile, and tear strengths as compared to corresponding binder compositions without starch. Table 1 shows the results of dry tensile, hot/wet tensile, and tear tests for non-woven fiber glass mat samples bonded with various UF resins. The UF resins evaluated included (1) a FG-705C UF resin from Hexion (standard resin), (2) a FG-705C UF resin from Hexion modified with 2.5%, 5%, 7.5%, and 10 wt. % RediBOND5330 starch, and (3) a FG-705C UF resin from Hexion modified with 2.5 wt. % GL720 acrylic latex from Rohm & Haas.

Dry tensile and hot/wet tensile strengths for fiber glass mats bonded with UF resins were measured in the machine direction (MD) at room temperature. Tear strengths for fiber glass mats bonded with UF resins were measured in both the machine direction and cross machine direction (CMD) at room temperature using a standard Instron.

TABLE 1

Physical Properties of UF Resins

| Binder | LOI | Dry Tensile (MD) | | Hot/Wet Tensile (MD) | | Hot/Wet Retention | Tear (MD + CMD) | |
| --- | --- | --- | --- | --- | --- | --- | --- | --- |
| | | Mean | STDev | Mean | STDev | | Mean | STDev |
| FG-705C (Standard) | 19.3% | 34.7 | 6.4 | 24.1 | 6.2 | 69.5% | 914.3 | 100.8 |
| FG-705C + 2.5% Starch | 18.9% | 38.6 | 4.5 | 26.3 | 4.1 | 68.1% | 1051.5 | 137.1 |
| FG-705C + 5% Starch | 18.9% | 43.8 | 7.3 | 27.8 | 5.2 | 63.5% | 1075.1 | 154.2 |
| FG-705C + 7.5% Starch | 19.0% | 46.0 | 9.8 | 29.4 | 3.6 | 63.9% | 1080.0 | 113.7 |
| FG-705C + 10% Starch | 19.1% | 44.8 | 11 | 30.8 | 1.9 | 68.8% | 1163.9 | 100.0 |
| FG-705C + 2.5% GL720 | 19.1% | 38.5 | 6.4 | 24.7 | 3.0 | 64.2% | 967.7 | 107.8 |

While not wishing to be bound by any particular scientific theory, it is believed that starch and UF resin crosslink with each other via reaction between hydroxyl functionalities on starch molecules and reactive functionalities on UF resin, and this crosslinking strengthens fiber glass composites. Latex modifiers are often non-reactive or less reactive toward UF resin, and thus there is minimal or no crosslinking between the UF resin and the latex modifier. The substantial increase in hot/wet tensile and tear strength for a UF resin modified with starch, as compared to a UF resin modified with latex (see FIG. 1), indicates that crosslinking occurs between UF resin and starch.

FIG. 1 shows the improvements in dry tensile, hot/wet tensile, and tear strength exhibited by starch modified UF resins and an acrylic latex modified UF resin over a standard UF resin. Substantial increases in dry tensile, hot/wet tensile and tear strength are obtained when starch is added to a standard UF resin. FIG. 1 also shows that comparable dry tensile strengths are exhibited by composites made with 2.5 wt. % latex modified UF resin and 2.5 wt. % starch modified UF resin. Both exhibit about an 11% increase in dry tensile strength over a standard UF binder. Additionally, FIG. 1 shows that a 2.5 wt. % starch modified UF resin exhibits improved hot/wet tensile and tear strength as compared to a 2.5 wt. % acrylic latex-modified UF resin, about 6.6% and 9.1% respectively.

Table 2 lists viscosities of various binder compositions at 16% solids. The data shows that the standard binder, the starch modified binder, and the latex modified binder all exhibit comparable viscosities.

TABLE 2

Viscosities of UF Resins

| Binder | Viscosity @ 16% Solids (cPs) |
| --- | --- |
| FG-705C (standard) | 5.44 |
| FG-705C + 1% Starch | 5.53 |
| FG-705C + 2.5% Starch | 5.53 |
| FG-705C + 2.5% GL720 | 5.06 |

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the starch" includes reference to one or more starches and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A binder composition comprising:
   a urea-formaldehyde resin;
   about 1 wt. % to about 10 wt. % of a starch crosslinking agent selected from the group consisting of a native starch, a cationically modified starch, and an anionically modified starch, wherein hydroxyl functional groups on the starch bond to reactive functional groups on the urea-formaldehyde resin; and
   wherein the binder composition lacks a styrene-containing, petroleum-based modifier,
   wherein the urea-formaldehyde resin and the starch crosslink to increase a hot/wet tensile strength of a fiber-reinforced composite formed with the binder composition by 5% to 35% compared to a comparative fiber-reinforced composite made with an unmodified urea-formaldehyde binder composition that lacks the starch.

2. The binder composition of claim 1, wherein the binder composition comprises about 1 wt. % to about 2.5 wt. % of the starch.

3. The binder composition of claim 1, wherein the binder composition has a solids content of greater than 35 wt. %.

4. The binder composition of claim 1, wherein the binder composition has a solids content of about 45 wt. % to about 70 wt. %.

5. The binder composition of claim 1, wherein the binder composition further comprises water.

6. The binder composition of claim 5, wherein the binder composition has a solids content of about 5 to 35 wt. %.

7. The binder composition of claim 1, wherein the pH of the composition is between about 7.0 and 9.0.

8. The binder composition of claim 1, wherein the binder composition comprises between about 45% to about 75% by weight nonvolatiles.

9. A fiber reinforced composite comprising:
   a polymer matrix formed from a binder composition that comprises:
   a urea-formaldehyde resin;
   about 1 wt. % to about 10 wt. % of a starch crosslinking agent selected from the group consisting of a native starch, a cationically modified starch, and an anionically modified starch, wherein hydroxyl functional groups on the starch bond to reactive functional groups on the urea-formaldehyde resin; and
   wherein the binder composition lacks a styrene-containing, petroleum-based modifier,
   organic or inorganic fibers,
   wherein the urea-formaldehyde resin and the starch are crosslinked to increase a hot/wet tensile strength of the fiber-reinforced composite by 5% to 35% compared to a comparative fiber-reinforced composite made with an unmodified urea-formaldehyde binder composition that lacks the starch.

10. The fiber reinforced composite of claim 9, wherein the organic or inorganic fibers comprise glass fibers.

11. The fiber reinforced composite of claim 9, wherein the composite comprises a non-woven glass-fiber reinforced mat.

12. The fiber reinforced composite of claim 11, wherein the non-woven glass-fiber reinforced mat forms part of a roofing shingle.

13. The fiber reinforced composite of claim 9, wherein a weight ratio of the starch to the petroleum-based modifier is about 0.1:1 or more.

14. A binder composition consisting of:
   a urea-formaldehyde resin; and
   about 1 wt. % to about 10 wt. % of a starch crosslinking agent selected from a native starch, a cationically modified starch, and an anionically modified starch wherein the starch does not substantially increase a viscosity of the binder composition, and wherein the binder composition lacks a styrene-containing, petroleum-based modifier, and wherein the urea-formaldehyde resin and the starch cross-link to increase a hot/wet tensile strength of a fiber-reinforced composite formed with the binder composition by 5% to 35% compared to a comparative fiber-reinforced composite made with an unmodified urea-formaldehyde binder composition that lacks the starch.

15. The binder composition of claim 14, wherein the binder composition comprises about 1 wt. % to about 2.5 wt. % of the starch.

16. The binder composition of claim 14, wherein the binder composition has a solids content of greater than 35 wt. %.

17. The binder composition of claim 14, wherein the binder composition has a solids content of about 45 wt. % to about 70 wt. %.

18. The binder composition of claim 14, wherein the urea-formaldehyde resin is an aqueous urea-formaldehyde resin.

19. The binder composition of claim 18, wherein the binder composition has a solids content of about 5 to 35 wt. %.

\* \* \* \* \*